(12) United States Patent
Fujimoto et al.

(10) Patent No.: US 9,651,936 B2
(45) Date of Patent: May 16, 2017

(54) MACHINING METHOD (71) Applicants: The University of Tokyo, Tokyo (JP); DMG MORI SEIKI CO., LTD., Nara (JP)

(72) Inventors: Hiroshi Fujimoto, Tokyo (JP); Teruaki Ishibashi, Tokyo (JP); Shinji Ishii, Nara (JP); Koji Yamamoto, Nara (JP); Yuki Terada, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 500 days.

(21) Appl. No.: 14/475,166

(22) Filed: Sep. 2, 2014

(65) Prior Publication Data

US 2015/0160643 A1 Jun. 11, 2015

(30) Foreign Application Priority Data

Dec. 11, 2013 (JP) ................. 2013-255798

(51) Int. Cl.
*G05B 19/404* (2006.01)
(52) U.S. Cl.
CPC .. *G05B 19/404* (2013.01); *G05B 2219/41115* (2013.01); *G05B 2219/41256* (2013.01)
(58) Field of Classification Search
None
See application file for complete search history.

(56) References Cited

U.S. PATENT DOCUMENTS

2007/0088456 A1* 4/2007 Schmitz ............... G05B 19/404
700/175
2010/0104388 A1* 4/2010 Suzuki ............... B23Q 11/0039
409/131

(Continued)

FOREIGN PATENT DOCUMENTS

| JP | 49105277 | 10/1974 |
|---|---|---|
| JP | 2000126991 A | 5/2000 |
| JP | 2012091283 A | 5/2012 |

OTHER PUBLICATIONS

Teruaki Ishibashi, Hiroshi Fujimoto, Shinji Ishii, Koji Yamamoto and Yuki Terada; "High Frequency Variation Speed Control of Spindle Motor for Self-Excited Chatter Vibration Suppression in NC Machine Tools"; The Papers of Technical Meeting on "Mechatronics Control"; The Institute of Electrical Engineers of Japan; Sep. 3, 2013; Lecture No. MEC-13-159.

*Primary Examiner* — Tuan Dao
(74) *Attorney, Agent, or Firm* — Miller, Matthias & Hull LLP (57) ABSTRACT

Using a machine tool, a workpiece is machined while periodically varying the rotational speed of a spindle thereof. Correlation data on correlation between a speed variation rate RVA of the spindle rotational speed, a speed variation period ratio RVF thereof, and vibration of a tool when machining the workpiece while periodically varying the spindle rotational speed is previously obtained. Based on the correlation data, the speed variation rate RVA and the speed variation period ratio RVF are set so that the vibration of the tool and machining accuracy are within their respective allowable ranges, and based on the set speed variation rate RVA and speed variation period ratio RVF, a variation amplitude and a variation period of the spindle rotational speed are determined. The spindle is rotated at the rotational speed varying at the determined amplitude and period with respect to a target rotational speed, thereby machining the workpiece.

9 Claims, 8 Drawing Sheets
(3 of 8 Drawing Sheet(s) Filed in Color)

(56) References Cited

U.S. PATENT DOCUMENTS

2012/0097411 A1* 4/2012 Yoshino .............. B23Q 17/12
                                              173/176
2013/0073251 A1* 3/2013 Nishimura ......... G05B 19/4062
                                              702/147

* cited by examiner

MACHINING METHOD

BACKGROUND

Field of the Disclosure

The present disclosure relates to a machining method of machining a workpiece using a machine tool, wherein the rotational speed of a spindle of the machine tool is periodically varied.

Background of the Disclosure

It has conventionally been well known that, when a workpiece is machined using a machine tool, chatter vibration deteriorates machining accuracy (in particular, surface accuracy). Such chatter vibration is roughly classified into forced chatter vibration and self-excited chatter vibration, and it is considered that forced chatter vibration is caused by an action of an excessively large external force or by synchronization between the frequency of an external force and the resonant frequency of a vibrating system and, on the other hand, self-excited chatter vibration is caused by continuation of cutting in which periodic variation in cutting resistance and periodic variation in thickness of cut enhance each other through interaction therebetween (the so-called "regeneration effect").

Further, conventionally, as a method of suppressing self-excited chatter vibration included in chatter vibration, a technique of periodically varying the rotational speed of a spindle at a predetermined amplitude has been suggested. Furthermore, a technique has been suggested in which the variation amplitude and the variation period of the spindle rotational speed are parameterized and the parameterized variation amplitude and variation period are changed when chatter vibration occurs.

Further, another technique has been suggested in which average rotational speed candidates having the effect of suppressing chatter vibration are determined in accordance with the following equation and a preset number of average rotational speed candidates closest to the current rotational speed are displayed on display means so that the operator can change the rotational speed to a desired one. Furthermore, the still another technique has been suggested in which the current set values are plotted on a plane whose vertical axis represents the period and whose horizontal axis represents the average rotational speed and values or ranges of the period and the average rotational speed having the effect of suppressing chatter vibration are displayed in color on the plane.

$$R=120/(m(2n-1)N),$$

where R is the rotational-speed variation period [s], m is the number of cutting edges of a tool, n represents an integer, and N is the average rotational speed of the spindle [min-1].

SUMMARY OF THE DISCLOSURE

Incidentally, in the techniques generally disclosed above, the spindle rotational speed is varied at predetermined variation amplitude and variation period so as to break the periodicities of the variation in cutting resistance and the variation in thickness of cut, and thereby, self-excited chatter vibration is suppressed. Therefore, taking into consideration only effective suppression of self-excited chatter vibration, self-excited chatter vibration is more suppressed when the variation amplitude of the spindle rotational speed is larger, and, to the contrary, self-excited chatter vibration is more suppressed when the variation period of the spindle rotational speed is shorter.

However, although increasing the variation amplitude of the spindle rotational speed provides the advantage that self-excited chatter vibration can be stably suppressed, in the case of a lathe, for example, it causes a large variation in the feed amount of tool per revolution of workpiece, and similarly in the case of a machining center, it causes a large variation in the feed amount per revolution of tool, and in both cases, a problem that the surface roughness of a machined workpiece surface is not uniform, that is, machining accuracy is deteriorated is brought about.

The same is true for the variation period of the spindle rotational speed. There is the advantage that self-excited chatter vibration is more suppressed when the variation period of the spindle rotational speed is shorter, whereas varying the spindle rotational speed at a short period makes the surface roughness of a machined workpiece surface non-uniform, which results in deterioration of machining accuracy. Additionally, the problem of excessive energy consumption is brought about.

The present disclosure has been achieved in view of the above-described circumstances, and an object thereof is to provide a machining method which enables obtaining a preferable machining accuracy while appropriately suppressing self-excited chatter vibration.

The present disclosure relates to a machining method of, in a machine tool, machining a workpiece while periodically varying a rotational speed of a spindle of the machine tool, the machining method comprising:

obtaining in advance correlation data indicative of correlation between a speed variation rate RVA of the rotational speed of the spindle, a speed variation period ratio RVF of the rotational speed of the spindle, and vibration occurring on a tool during machining when the workpiece is machined while periodically varying the rotational speed of the spindle;

setting values of the speed variation rate RVA and the speed variation period ratio RVF on the basis of the obtained correlation data so that the vibration of the tool is within an allowable range and machining accuracy is within an allowable range, and then determining a variation amplitude and a variation period of the rotational speed of the spindle on the basis of the set speed variation rate RVA and the set speed variation period ratio RVF; and rotating the spindle so that the rotational speed of the spindle varies at the determined variation amplitude and the determined variation period with respect to a target rotational speed, thereby machining the workpiece, wherein $$RVA=N_A/N_0,$$

and $$RVF=2\tau/(N_0 \times T),$$

where T is the variation period [s] of the rotational speed of the spindle, $N_A$ is the variation amplitude [rad/s] of the rotational speed of the spindle, and $N_0$ is the target rotational speed, that is, an average [rad/s] of the rotational speed of the spindle in a section T.

According to the present disclosure, first, correlation data indicative of correlation between the speed variation rate RVA of the rotational speed of the spindle, the speed variation period ratio RVF of the rotational speed of the spindle, and vibration occurring on a tool during machining when a workpiece is machined while periodically varying the rotational speed of the spindle is obtained in advance.

This correlation data can be obtained by a machining simulation based on CAE analysis or the like using three-dimensional models of the machine tool, workpiece, and tool used for machining, or can be obtained by, during actual machining using the machine tool, the workpiece and the tool, measuring displacement (vibration) of the tool by an optical displacement sensor, an accelerometer or the like.

Sequentially, the values of the speed variation rate RVA and the speed variation period ratio RVF are set based on the obtained correlation data so that the vibration of the tool is within an allowable range and machining accuracy is within an allowable range, and then the vibration amplitude and the variation period of the rotational speed of the spindle are determined based on the set speed variation rate RVA and the set speed variation period ratio RVF. Then, the spindle is rotated so that the rotational speed thereof varies at the determined variation amplitude and the determined variation period with respect to the target rotational speed, thereby machining the workpiece.

Thus, according to the machining method of the present disclosure, since the values of the speed variation rate RVA and the speed variation period ratio RVF are set based on the correlation data indicative of the correlation between the speed variation rate RVA of the rotational speed of the spindle, the speed variation period ratio RVF of the rotational speed of the spindle, and vibration occurring on the tool during machining so that the vibration of the tool is within an allowable range and machining accuracy is within an allowable range, a preferable machining accuracy can be achieved while self-exited chatter vibration is appropriately suppressed.

It is noted that, as described above, reducing the variation period of the rotational speed of the spindle, i.e., increasing the speed variation period ratio RVF allows a more stable suppression of self-exited chatter vibration, but is likely to deteriorate machining accuracy. On the other hand, reducing the variation amplitude of the rotational speed of the spindle, i.e., reducing the speed variation rate RVA allows achievement of a more preferable machining accuracy, but leads to an incomplete suppression of self-exited chatter vibration. Therefore, taking account of these opposite actions of the variation amplitude and the variation period, when the speed variation rate RVA is set to its minimum value and the speed variation period ratio RVF is set to its maximum value within an allowable vibration range of the tool, the actions of the speed variation rate RVA and the speed variation period ratio RVF are balanced, which makes it possible to achieve a preferable machining accuracy while stably suppressing self-exited chatter vibration.

On the other hand, when taking the above-described opposite actions into consideration, if greater importance is attached to machining accuracy, it is preferable to set both of the speed variation rate RVA and the speed variation period ratio RVF to their respective minimum values. Thereby, a more preferable machining accuracy can be achieved while self-exited chatter vibration is properly suppressed.

As described above, according to the machining method of the present disclosure, since the values of the speed variation rate RVA and the speed variation period ratio RVF are set based on the correlation data indicative of the correlation between the speed variation rate RVA of the rotational speed of the spindle, the speed variation period ratio RVF of the rotational speed of the spindle, and the vibration occurring on the tool during machining so that the vibration of the tool is within an allowable range and machining accuracy is within an allowable range, a preferable machining accuracy is achieved while self-excited chatter vibration is appropriately suppressed.

Further, when the speed variation rate RVA is set to its minimum value and the speed variation period ratio RVF is set to its maximum value within the allowable vibration range of the tool, a preferable machining accuracy is achieved while self-excited chatter vibration is stably suppressed. Furthermore, when both of the speed variation rate RVA and the speed variation period ratio RVF are set to their respective minimum values, a more preferable machining accuracy is achieved while self-excited chatter vibration is properly suppressed.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Hereinafter, a specific embodiment of the present disclosure will be described with reference to the drawings.

Figure 1:
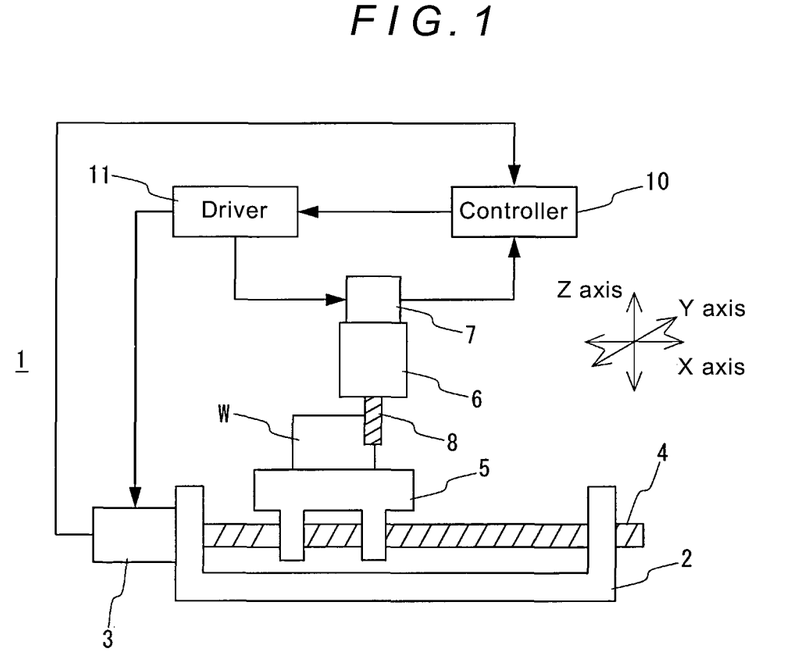
FIG. 1 is an explanatory diagram showing a machining model for carrying out a machining method according to one embodiment of the present disclosure.

First, a schematic model of a machine tool for carrying out a machining method of this embodiment will be described. FIG. 1 is an explanatory diagram showing the schematic model of the machine tool. As shown in FIG. 1, the machine tool 1 of this embodiment includes a base 2, a ball screw 4 supported by the base 2 to be rotatable, a feed motor 3 which rotates the ball screw 4 around its axis, a table 5 which is screwed to the ball screw 4 and is moved in the axial direction of the ball screw 4 (X-axis direction) by the rotation of the ball screw 4, a spindle 6 disposed in an area above the table 5, a spindle motor 7 which rotates the spindle 6 around its axis, a controller 10 which numerically controls the feed motor 3 and the spindle motor 7, and a driver 11 which, based on a control signal transmitted from the controller 10, supplies the motor 3 and the spindle motor 7 with power corresponding to the control signal.

It is noted that, although, for the sake of convenience, FIG. 1 depicts only a feed mechanism (the ball screw 4 and the feed motor 3) for moving the table 5 in the X-axis direction, the machine tool 1 also includes a feed mechanism for moving the table 5 and the spindle 6 relative to each other in the Y-axis and Z-axis directions shown in FIG. 1 and operation of this feed mechanism is also controlled by the controller 10 and the driver 11.

Thus, in the machine tool 1, under the control by the controller 10, the table 5 and the spindle 6 are moved relative to each other along the three orthogonal axes: the X axis, the Y axis, and the Z axis by the feed mechanisms including the feed motor 3 and the spindle motor 7. Further, a workpiece W is placed on the table 5 and a tool 8 is attached to the spindle 6, and the table 5 and the spindle 6 are moved relative to each other as appropriate in a state where the spindle 6 is rotated at a predetermined rotational speed, thereby machining the workpiece W.

It is noted that, obviously, the machine tool used in the present disclosure is not limited to a machine tool having the above-described configuration and includes, besides an NC lathe, every type of known machine tool that cuts and machines a workpiece through relative rotation of a tool and the workpiece.

Figure 2:
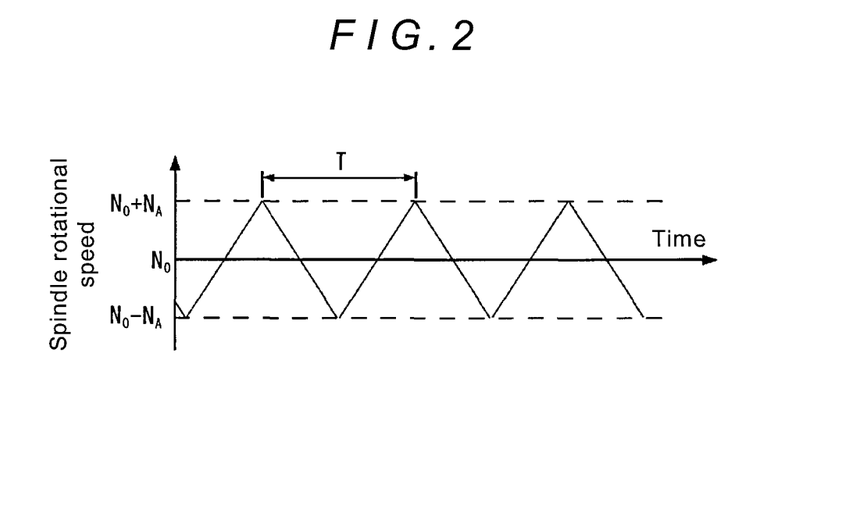
FIG. 2 is an explanatory diagram for explaining a variation amplitude and a variation period of a spindle rotational speed in the machining method of the embodiment.

Next, a machining method of this embodiment will be described. First of all, the value of vibration occurring on the tool 8 when machining is performed using the machine tool 1 while the rotational speed of the spindle 6 is varied at a predetermined variation amplitude $2 \times N_A$ [rad/s] and a predetermined variation period T [s] with respect to a predetermined target rotational speed (average rotational speed) $N_0$ [rad/s] as shown in FIG. 2 is obtained in advance using the variation amplitude and the variation period as variables. Then, correlation data indicative of correlation between a speed variation rate RVA of the spindle rotational speed, a speed variation period ratio RVF of the spindle rotational speed, and the vibration occurring on the tool 8 is obtained. It is noted that the speed variation rate RVA and the speed variation period ratio RVF are represented by the following equations. Further, a variation waveform of the rotational speed is not limited to a triangular waveform as shown in FIG. 2, and may be a sinusoidal waveform or a trapezoidal waveform, for example.

$RVA=N_A/N_0$ $RVF=2\pi/(N_0 \times T)$

This correlation data can be obtained by a machining simulation based on CAE analysis or the like using three-dimensional models of the machine tool 1, the workpiece W, and the tool 8, or by measuring the vibration of the tool 8 by an accelerometer, an optical displacement sensor, or the like during actual machining using the machine tool 1, the workpiece W, and the tool 8. It is noted that cutting conditions for the machining simulation and the actual machining are cutting conditions which are to be actually applied and under which self-excited chatter vibration occurs.

Figure 3:
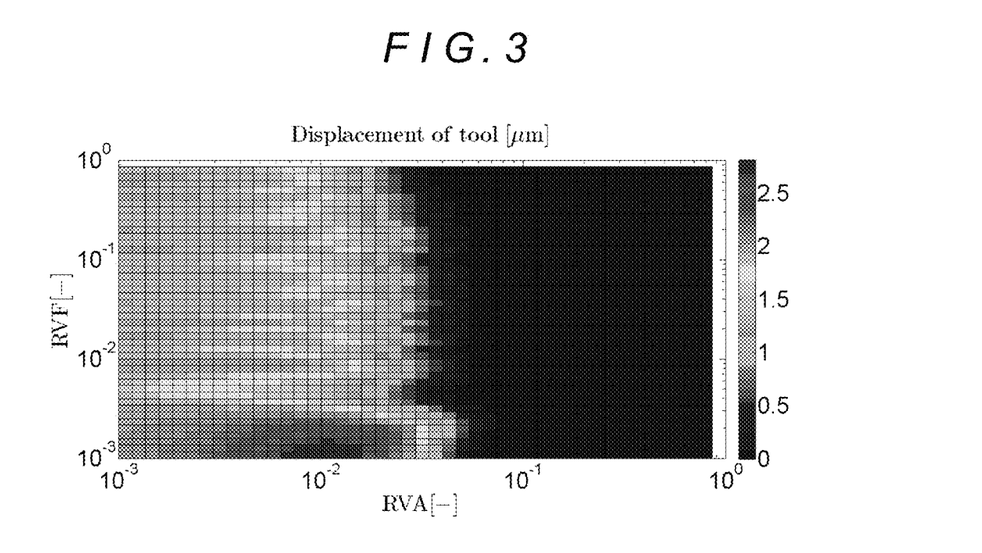
FIG. 3 is a state diagram showing correlation between a speed variation rate RVA, a speed variation period ratio RVF, and displacement (vibration) of a tool.
Figure 4:
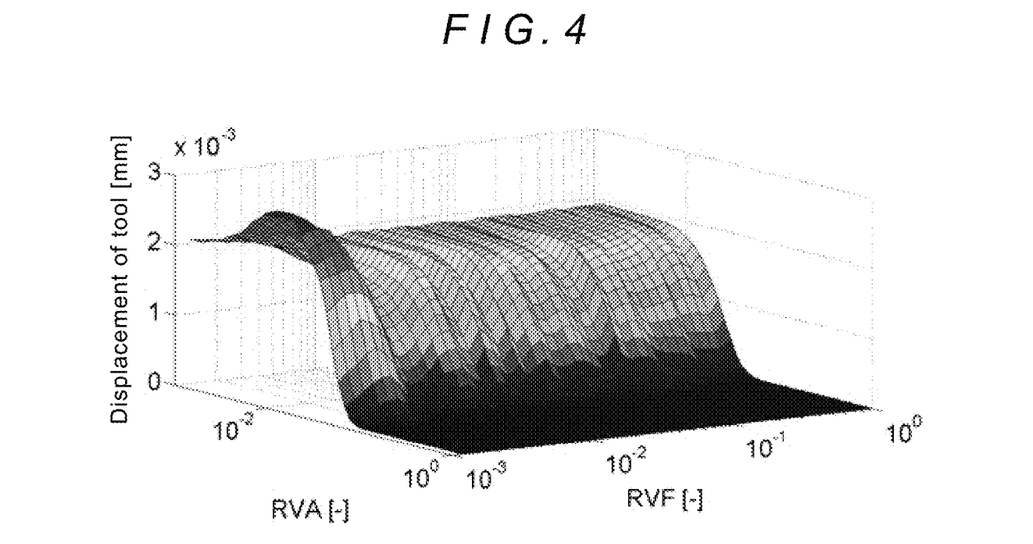
FIG. 4 is a state diagram showing the correlation between the speed variation rate RVA, the speed variation period ratio RVF, and the displacement (vibration) of the tool.

The correlation data, which is obtained by a machining simulation, is shown in FIGS. 3 and 4. FIG. 3 shows a state diagram whose horizontal axis represents the speed variation rate RVA and whose vertical axis represents the speed variation period ratio RVF and which shows the magnitude (level) of displacement (vibration) of the tool 8 which is color-coded according to the magnitude of displacement and further is represented in gray scale. Further, FIG. 4 is a state diagram whose vertical axis represents the displacement of the tool 8 and whose horizontal axes represent the speed variation rate RVA and the speed variation period ratio RVF and which shows the magnitude of displacement of the tool 8 which is color-coded according to the magnitude of displacement and represented in a three-dimensional manner and further is represented in gray scale. In the color coding, red becomes deeper as the displacement becomes larger, blue becomes deeper as the displacement becomes smaller, and the middle is yellow.

It is noted that, in the above machining simulation, the feed rate Vs of the tool 8 is set to $2 \times 10^{-3}$ [m/s], the width of cut a to $5 \times 10^{-3}$ [m], the intrinsic cutting force Kt to 300 [MPa], the dynamic mass M to 10 [Ns$^2$/m], the mechanical impedance B to 200 [Ns/m], and the dynamic rigidity K to $5 \times 10^5$ [N/m]. In addition, as shown in FIG. 2, the average rotational speed of the spindle 6 is set to 262 [rad/s], at which self-excited chatter vibration occurs, and the speed variation rate RVA and the speed variation period ratio RVF are each changed in a range of 0.001 or more to 1.0 or less.

Figure 5:
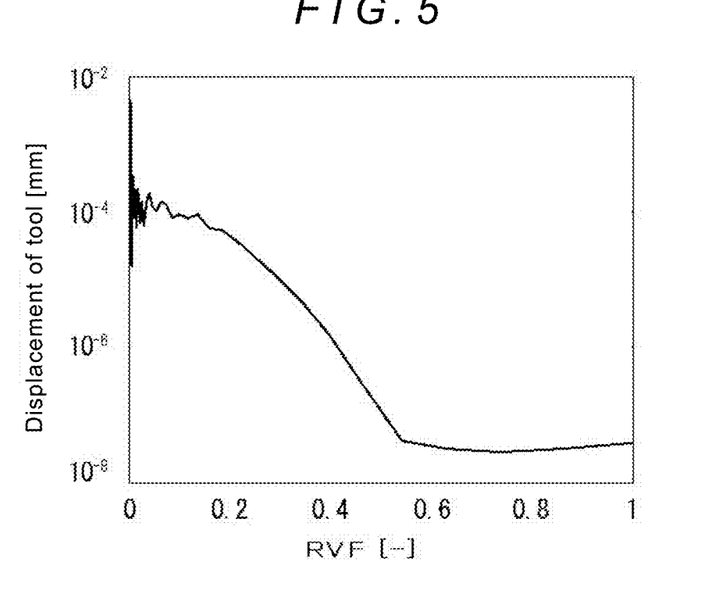
FIG. 5 is an explanatory diagram showing the displacement of the tool that results when the speed variation period ratio RVF is changed with the speed variation rate RVA set to 0.1.

The results thereof shown FIGS. 3 and 4 demonstrate that the displacement, i.e., vibration of the tool 8 is reduced as the speed variation rate RVA and the speed variation period ratio RVF each increase. Further, the results also demonstrate that sharp suppression of self-excited chatter vibration of the tool 8 starts near a point at which the speed variation rate RVA reaches 0.05 and the displacement of the tool 8 is well suppressed in an area in which the speed variation rate RVA is smaller than 0.05. In this connection, FIG. 5 depicts the displacement of the tool 8 that results when the speed variation period ratio RVF is changed with the speed variation rate RVA fixed to 0.1. It is found that, in this case, setting the speed variation period ratio RVF to a value equal to or larger than 0.5 suppresses self-excited chatter vibration of the tool 8.

Figure 6:
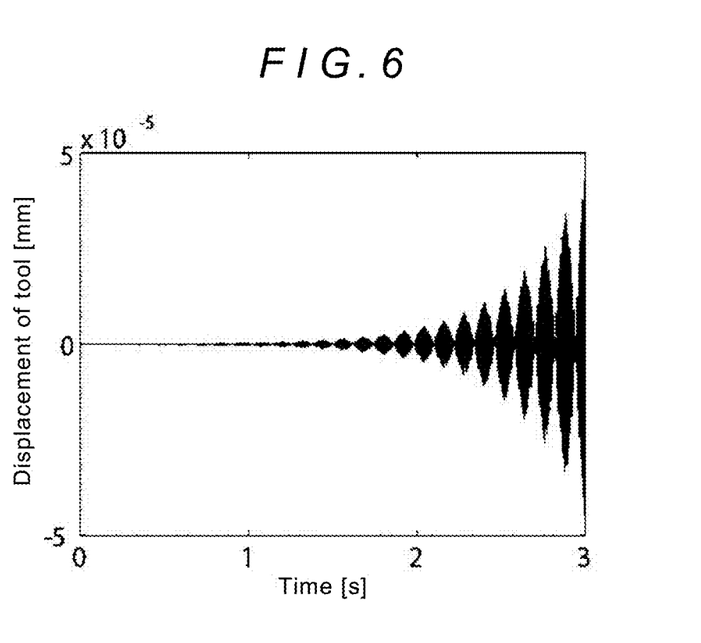
FIG. 6 is an explanatory diagram showing a state of the displacement of the tool that results when the speed variation rate RVA and the speed variation period ratio RVF are set to 0.1 and 0.2, respectively.
Figure 7:
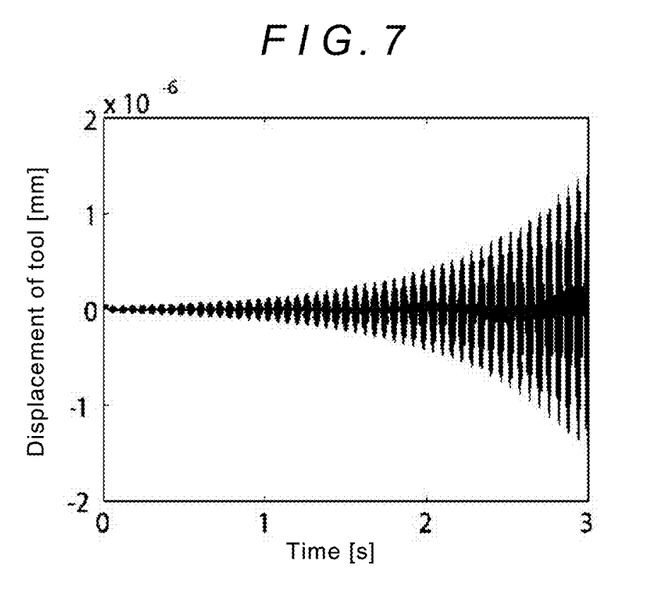
FIG. 7 is an explanatory diagram showing a state of the displacement of the tool that results when the speed variation rate RVA and the speed variation period ratio RVF are set to 0.1 and 0.4, respectively.
Figure 8:
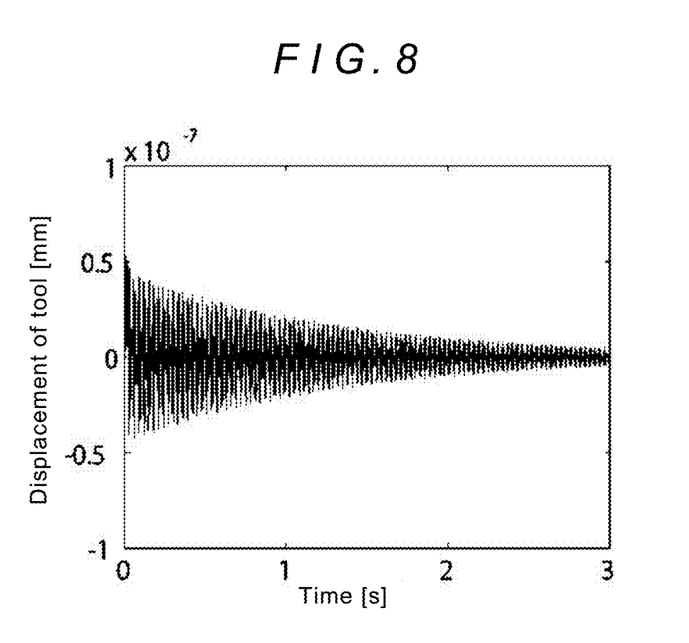
FIG. 8 is an explanatory diagram showing a state of the displacement of the tool that results when the speed variation rate RVA and the speed variation period ratio RVF are set to 0.1 and 0.8, respectively.

FIG. 6 depicts a state of the displacement of the tool 8 that results when the speed variation period ratio RVF is set to 0.2 with the speed variation rate RVA set to 0.1, FIG. 7 depicts a state of the displacement of the tool 8 that results when the speed variation period ratio RVF is set to 0.4 with the speed variation rate RVA set to 0.1, and FIG. 8 depicts a state of the displacement of the tool 8 that results when the speed variation period ratio RVF is set to 0.8 with the speed variation rate RVA set to 0.1. As seen from FIGS. 6 to 8, in the case where the speed variation period ratio RVF is set to 0.2 or 0.4, the displacement of the tool 8 increases as time elapses, which means that the self-excited chatter vibration cannot be suppressed, whereas, in the case where the speed variation period ratio RVF is set to 0.8, the displacement of the tool 8 decreases as time elapses, which means that the self-excited chatter vibration is suppressed.

As understood from the foregoing, self-excited chatter vibration of the tool 8 can be more stably suppressed as each of the speed variation rate RVA and the speed variation period ratio RVF is increased.

Further, in this embodiment, based on the correlation data indicative of the correlation between the speed variation rate RVA, the speed variation period ratio RVF, and the displacement (vibration) of the tool 8, which has been obtained in the above-described manner, the speed variation rate RVA and the speed variation period ratio RVF are set so that the vibration of the tool 8 is within an allowable range and machining accuracy is within an allowable range.

For example, based on the correlation data shown in FIGS. 3 and 4, since it is conceivable that the vibration of the tool 8 is kept within an allowable range when, as described above, the speed variation rate RVA is equal to or larger than 0.3 and the speed variation period ratio RVF is equal to or larger than 0.01, when the aspect of keeping the vibration of the tool 8 within an allowable range is taken into consideration, it is preferable that the speed variation rate RVA be equal to or larger than 0.3 and the speed variation period ratio RVF be equal to or larger than 0.01.

On the other hand, as understood from the above equations, increasing the speed variation rate RVA means increasing the variation amplitude of the spindle rotational speed, and increasing the variation amplitude of the spindle rotational speed, for example, causes a great variation in the feed amount of tool per revolution of workpiece in the case of a lathe and similarly causes a great variation in the feed amount per revolution of tool in the case of a machining center. In both cases, the surface roughness of a machined workpiece surface tends to become non-uniform, that is, machining accuracy tends to be deteriorated. Therefore, when the aspect of machining accuracy is taken into consideration, it is preferable that the speed variation rate RVA is as small as possible.

Further, increasing the speed variation period ratio RVF means reducing the variation period of the spindle rotational speed, and reducing the variation period of the spindle rotational speed, that is, varying the spindle rotational speed at a short period makes the surface roughness of a machined workpiece surface non-uniform and, also in this case, machining accuracy tends to be deteriorated. However, the degree of the effect on machining accuracy is smaller than that in the case of increasing the variation amplitude of the spindle rotational speed.

Based on the foregoing, in this embodiment, the speed variation rate RVA is set to its minimum value and the speed variation period ratio RVF is set to its maximum value within the allowable vibration range of the tool 8. For example, based on the correlation data shown in FIGS. 3 and 4, the speed variation rate RVA is set to 0.3 and the speed variation period ratio RVF is set to 1.0.

Subsequently, based on the set speed variation rate RVA and speed variation period ratio RVF, the variation amplitude $N_A$ and the variation period T of the spindle rotational speed are determined. Then, under control by the controller 10, the spindle 6 is rotated so that the rotational speed thereof varies at the determined variation amplitude $N_A$ and variation period T with respect to the average (target) rotational speed $N_0$, thereby machining the workpiece W. It is noted that the variation amplitude $N_A$ and the variation period T can be calculated using the following equations derived from the above equations:

$$N_A = N_0 \times RVA,$$

and $$T = 2\tau/(N_0 \times RVF).$$

For example, in the above example in which $N_0$=262 [rad/s], RVA=0.3, and RVF=1.0, the variation amplitude $N_A$ and the variation period T are as follows:

$$N_A = N_0 \times RVA = 262 \times 0.3 = 78.6 \text{ [rad/s]},$$

and $$T = 2\tau/(N_0 \times RVF) = 2\tau/(262 \times 1.0) = 0.024 \text{ [s]}.$$

Thus, according to the machining method of this embodiment, since, based on the correlation data indicative of the correlation between the speed variation rate RVA of the spindle rotational speed, the speed variation period ratio RVF of the spindle rotational speed, and the vibration occurring on the tool 8 during machining, the speed variation rate RVA is set to its minimum value and the speed variation period ratio RVF is set to its maximum value within the allowable vibration range of the tool 8, a preferable machining accuracy can be achieved while self-excited chatter vibration is stably suppressed.

It is noted that, as described above, when increasing the speed variation period ratio RVF, that is, when varying the spindle rotational speed at a short period, there is the tendency that the surface roughness of a machined workpiece surface becomes non-uniform and machining accuracy is deteriorated. Therefore, if greater importance is attached to the aspect of machining accuracy, both of the speed variation rate RVA and the speed variation period ratio RVF may be set to their respective minimum values within the allowable vibration range of the tool 8. In this case, a more preferable machining accuracy can be achieved while self-exited chatter vibration is properly suppressed.

Figure 9:
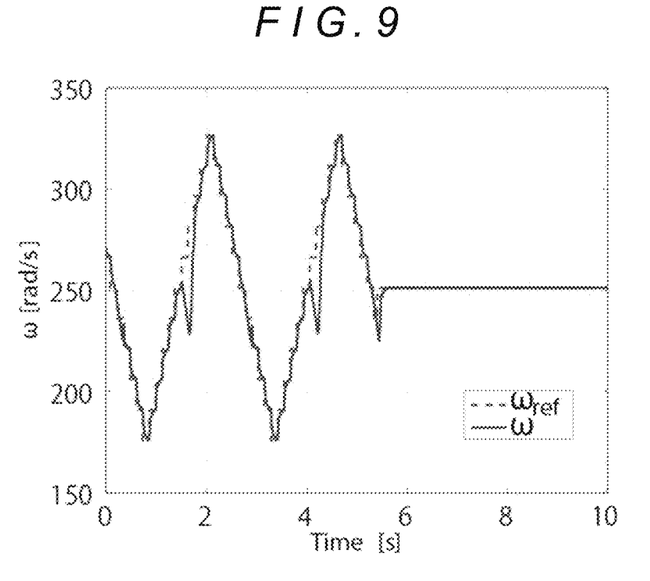
FIG. 9 is an explanatory diagram showing a spindle rotational speed.
Figure 10:
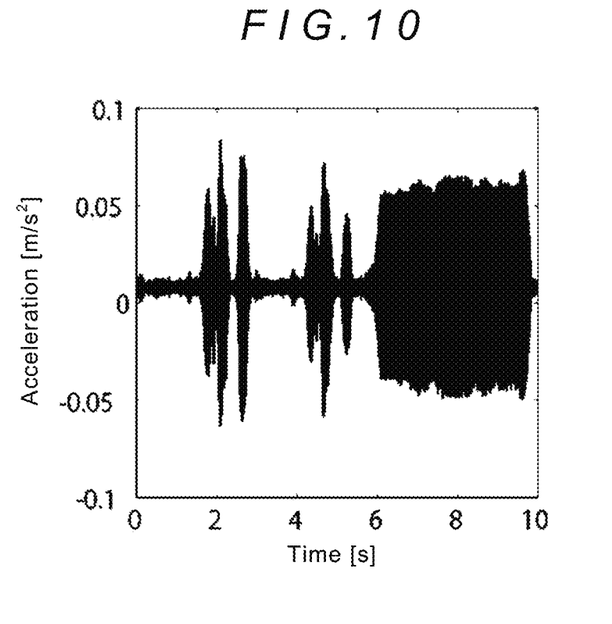
FIG. 10 is an explanatory diagram showing acceleration (vibration) of the tool that results when the spindle is rotated at the rotational speed shown in FIG. 9.

In this connection, FIG. 10 depicts the result of detection of the vibration of the tool 8 using an acceleration sensor when the workpiece W is machined under the above-mentioned cutting conditions while rotating the spindle 6 at the rotational speed shown in FIG. 9. It is noted that the rotational speed of the spindle 6 shown in FIG. 9 is periodically varied at the speed variation rate RVA of 0.3 and the speed variation period ratio RVF of 0.01 with the average rotational speed $N_0$ set to 262 [rad/s] for about 6 [s] after the start of cutting and then is fixed to a constant rotational speed. In FIG. 9, ω denotes the actual rotational speed of the spindle 6 and $\omega_{ref}$ denotes an input value input to the spindle motor 7.

Figure 11:
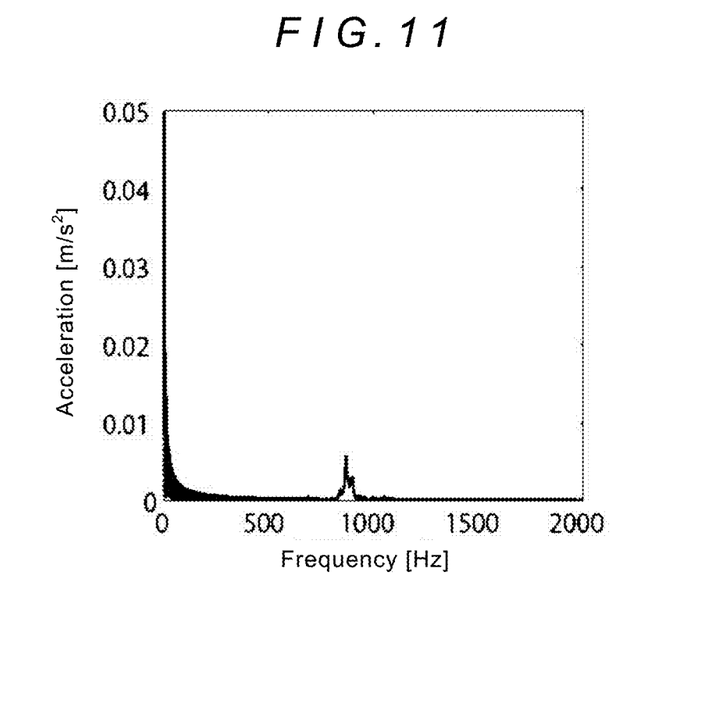
FIG. 11 is an explanatory diagram showing the frequency components of the acceleration (vibration) of the tool during the period variation duration shown in FIG. 9.
Figure 12:
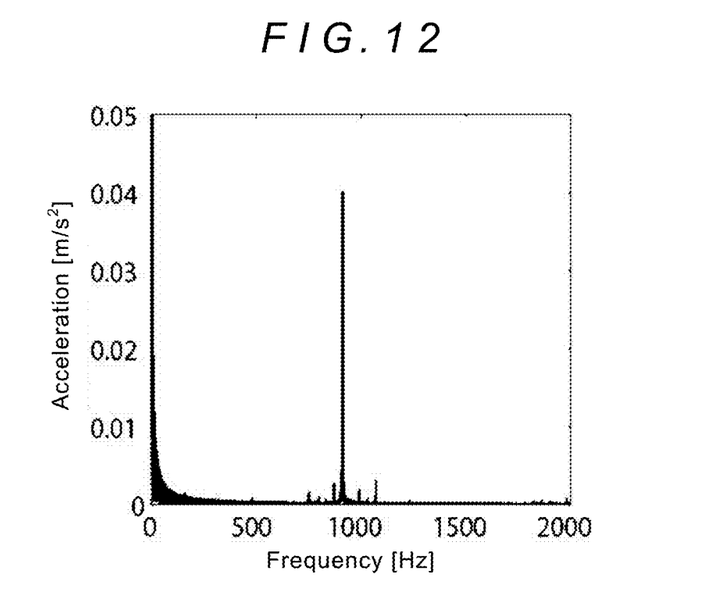
FIG. 12 is an explanatory diagram showing the frequency components of the acceleration (vibration) of the tool during the constant speed duration shown in FIG. 9.

The obtained data on the variation of the tool 8 is then subjected to a spectral analysis. FIGS. 11 and 12 depict the result of the spectral analysis. FIG. 11 depicts the frequency components of the acceleration (vibration) of the tool 8 during the period in which the rotational speed is periodically varied, and FIG. 12 depicts the frequency components of the acceleration (vibration) of the tool 8 during the period in which the rotational speed is fixed to the constant speed. As seen from FIGS. 11 and 12, self-excited chatter vibration of the tool 8 can be suppressed by periodically varying the rotational speed of the spindle 6 so that the speed variation rate RVA is 0.3 and the speed variation period ratio RVF is 0.01.

Figure 13:
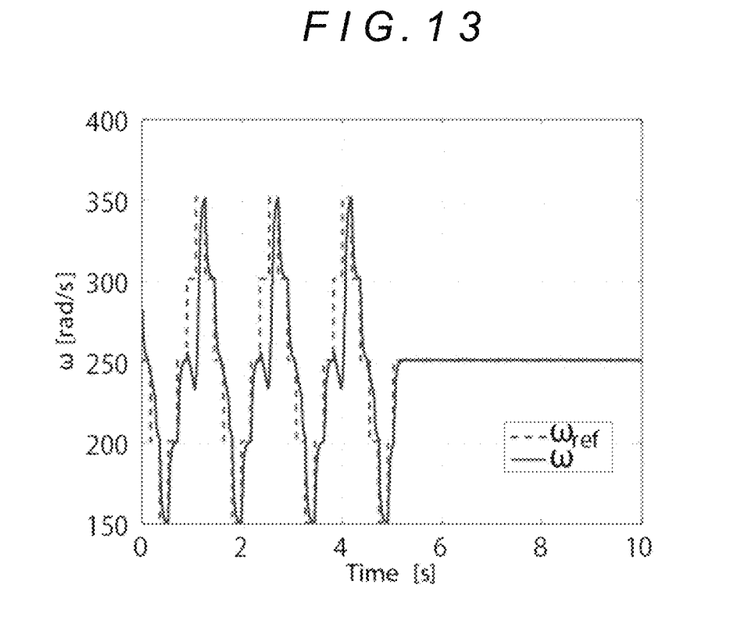
FIG. 13 is an explanatory diagram showing a spindle rotational speed.
Figure 14:
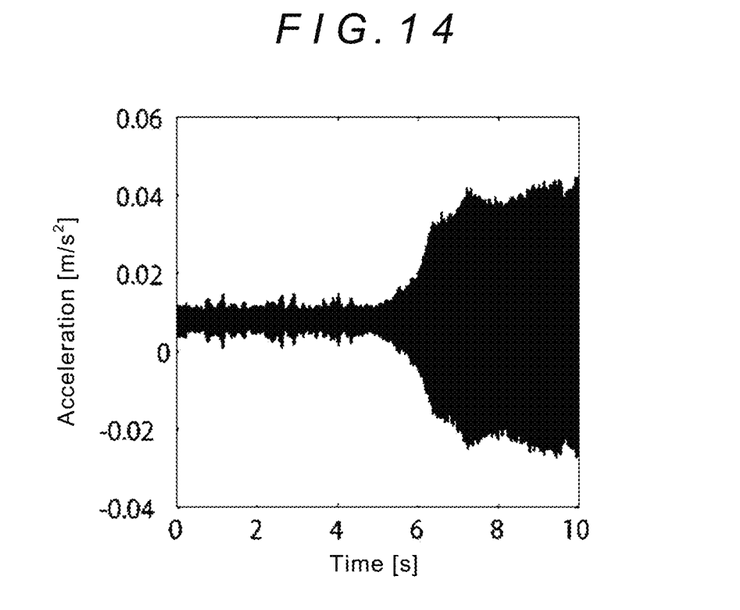
FIG. 14 is an explanatory diagram showing acceleration (vibration) of the tool that results when the spindle is rotated at the rotational speed shown in FIG. 13.

Further, FIG. 14 depicts the result of detection of the vibration of the tool 8 using an acceleration sensor when the workpiece W is machined under the above-mentioned cutting conditions while rotating the spindle 6 at the rotational speed shown in FIG. 13. It is noted that the rotational speed of the spindle 6 shown in FIG. 13 is periodically varied at the speed variation rate RVA of 0.4 and the speed variation period ratio RVF of 0.02 with the average rotational speed $N_0$ set to 262 [rad/s] for about 5 [s] after the start of cutting, and then is fixed to a constant rotational speed. In FIG. 13, ω denotes the actual rotational speed of the spindle 6 and $\omega_{ref}$ denotes an input value input to the spindle motor 7.

Figure 15:
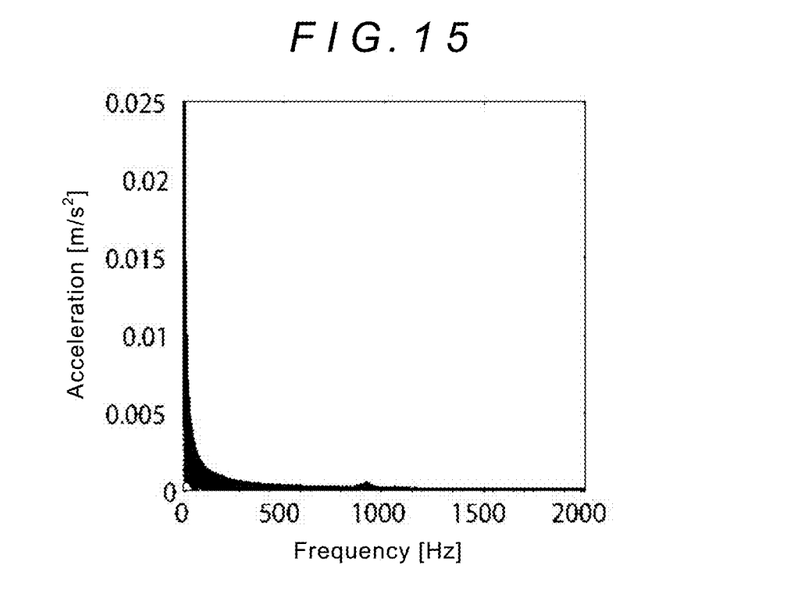
FIG. 15 is an explanatory diagram showing the frequency components of the acceleration (vibration) of the tool during the period variation duration shown in FIG. 13.
Figure 16:
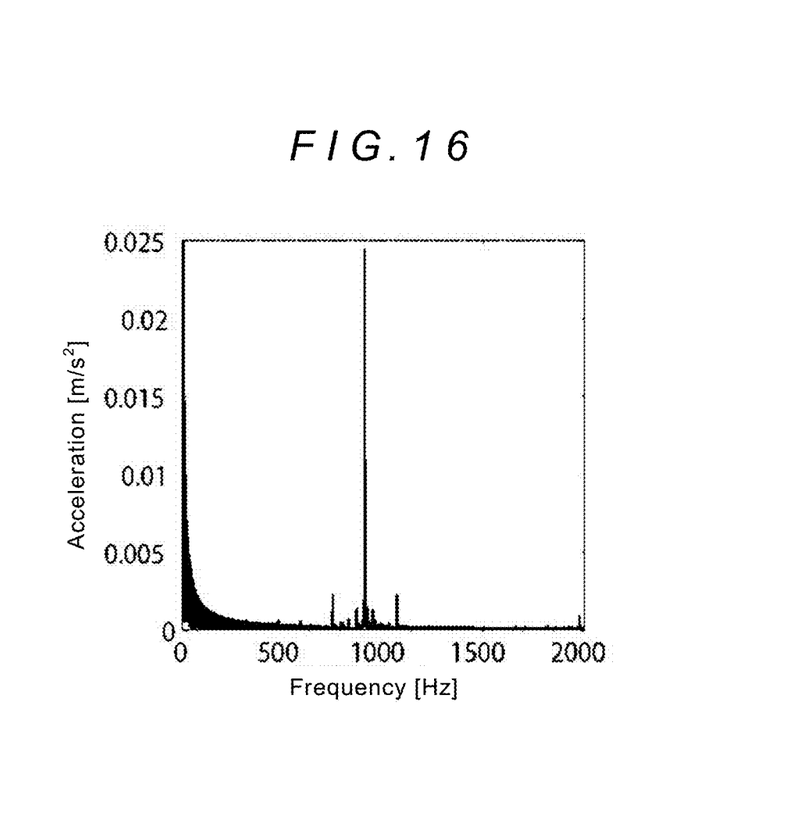
FIG. 16 is an explanatory diagram showing the frequency components of the acceleration (vibration) of the tool during the constant speed duration shown in FIG. 13.

The obtained data on the variation of the tool 8 is then subjected to a spectral analysis. FIGS. 15 and 16 depict the result of the spectral analysis. FIG. 15 depicts the frequency components of the acceleration (vibration) of the tool 8 during the period in which the rotational speed is periodically varied, and FIG. 16 depicts the frequency components of the acceleration (vibration) of the tool 8 during the period in which the rotational speed is fixed to the constant speed. As seen from FIGS. 15 and 16, self-excited chatter vibration of the tool 8 can be suppressed by periodically varying the rotational speed of the spindle 6 so that the speed variation rate RVA is 0.4 and the speed variation period ratio RVF is 0.02.

As described in detail above, according to the machining method of this embodiment, since, based on the correlation data indicative of the correlation between the speed variation rate RVA of the spindle rotational speed, the speed variation period ratio RVF of the spindle rotational speed, and the vibration occurring on the tool during machining, the values of the speed variation rate RVA and the speed variation period ratio RVF are set so that the vibration of the tool is within an allowable range and machining accuracy is within an allowable range, that is, within an allowable vibration range of the tool, the speed variation rate RVA is set to its minimum value and the speed variation period ratio RVF is set to its maximum value or both of the speed variation rate RVA and the speed variation period ratio RVF are set to their respective minimum values, a preferable machining accuracy can be achieved while self-excited chatter vibration is appropriately suppressed.

Thus, although a specific embodiment of the present disclosure has been described, the present disclosure is not limited to the above.

For example, although, in the above embodiment, within an allowable vibration range of the tool 8, the speed variation rate RVA is set to its minimum value and the speed variation period ratio RVF is set to its maximum value, or both of the speed variation rate RVA and the speed variation period ratio RVF are set to their respective minimum values, the present disclosure is not limited thereto, and each of the speed variation rate RVA and the speed variation period ratio RVF may take any value as long as the vibration of the tool is within an allowable range and machining accuracy is within an allowable range.

What is claimed is:

1. A machining method of machining a workpiece using a machine tool while periodically varying a rotational speed of a spindle of the machine tool, the machining method comprising:
  obtaining in advance correlation data indicative of correlation between a speed variation rate RVA of the rotational speed of the spindle, a speed variation period ratio RVF of the rotational speed of the spindle, and vibration occurring on a tool during machining when the workpiece is machined while periodically varying the rotational speed of the spindle;
  setting values of the speed variation rate RVA and the speed variation period ratio RVF on the basis of the obtained correlation data so that the vibration of the tool is within an allowable range and machining accuracy is within an allowable range, and then determining a variation amplitude and a variation period of the rotational speed of the spindle on the basis of the set speed variation rate RVA and the set speed variation period ratio RVF; and
  rotating the spindle so that the rotational speed of the spindle varies at the determined variation amplitude and the determined variation period with respect to a target rotational speed, thereby machining the workpiece, wherein $$RVA = N_A/N_0,$$

and $$RVF = 2\tau/(N_0 \times T),$$

where T is the variation period [s] of the rotational speed of the spindle, $N_A$ is the variation amplitude [rad/s] of the rotational speed of the spindle, and $N_0$ is the target rotational speed [rad/s].

2. The machining method of claim 1, wherein:
  when setting the value of the speed variation rate RVA and the value of the speed variation period ratio RVF on the basis of the correlation data, the speed variation rate RVA is set to its minimum value and the speed variation period ratio RVF is set to its maximum value within an allowable vibration range of the tool.

3. The machining method of claim 1, wherein:
  when setting the value of the speed variation rate RVA and the value of the speed variation period ratio RVF on the basis of the correlation data, both of the speed variation rate RVA and the speed variation period ratio RVF are set to their respective minimum values within an allowable vibration range of the tool.

4. The machining method of claim 1, wherein the correlation data is obtained by a machining simulation using a three-dimensional model of the machine tool.

5. The machining method of claim 2, wherein the correlation data is obtained by a machining simulation using a three-dimensional model of the machine tool.

6. The machining method of claim 3, wherein the correlation data is obtained by a machining simulation using a three-dimensional model of the machine tool.

7. The machining method of claim 1, wherein the correlation data is obtained by actual machining using the machine tool.

8. The machining method of claim 2, wherein the correlation data is obtained by actual machining using the machine tool.

9. The machining method of claim 3, wherein the correlation data is obtained by actual machining using the machine tool.

\* \* \* \* \*

UNITED STATES PATENT AND TRADEMARK OFFICE
CERTIFICATE OF CORRECTION

PATENT NO. : 9,651,936 B2
APPLICATION NO. : 14/475166
DATED : May 16, 2017
INVENTOR(S) : Fujimoto et al.

Page 1 of 1

It is certified that error appears in the above-identified patent and that said Letters Patent is hereby corrected as shown below:

On the Title Page

Item (73) the Assignee should read:

DMG MORI SEIKI CO., LTD.
106 KITAKORIYAMA-CHO, YAMATOKORIYAMA-SHI
NARA, JAPAN 639-1160

THE UNIVERSITY OF TOKYO
3-1, HONGO 7-CHOME, BUNKYO-KU
TOKYO, JAPAN 113-8654

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*